Feb. 14, 1950 J. C. RICHARDSON 2,497,274
PIPE CONNECTOR
Filed Oct. 2, 1946 2 Sheets-Sheet 2
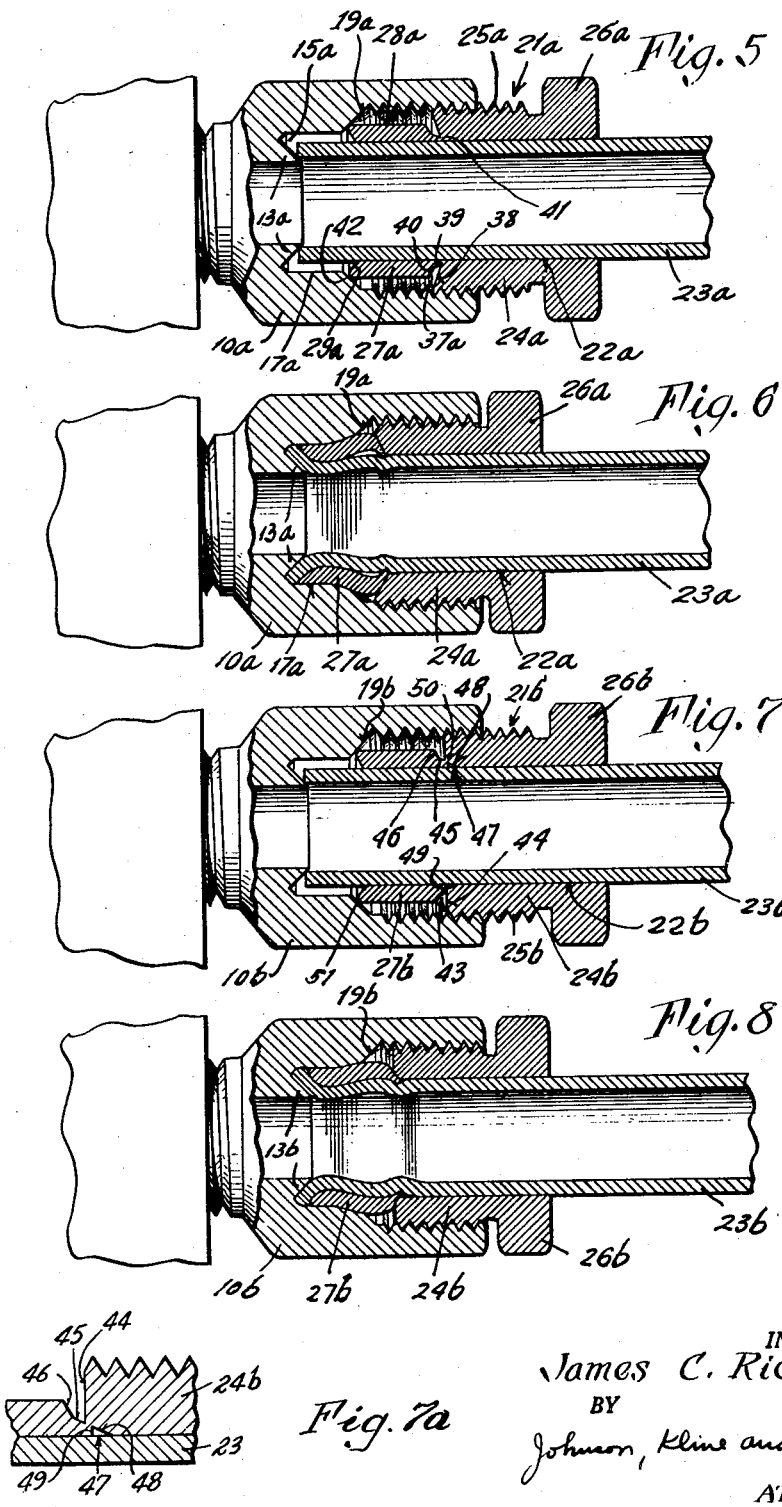
INVENTOR.
James C. Richardson
BY
Johnson, Kline and Hensel
ATTORNEYS Patented Feb. 14, 1950

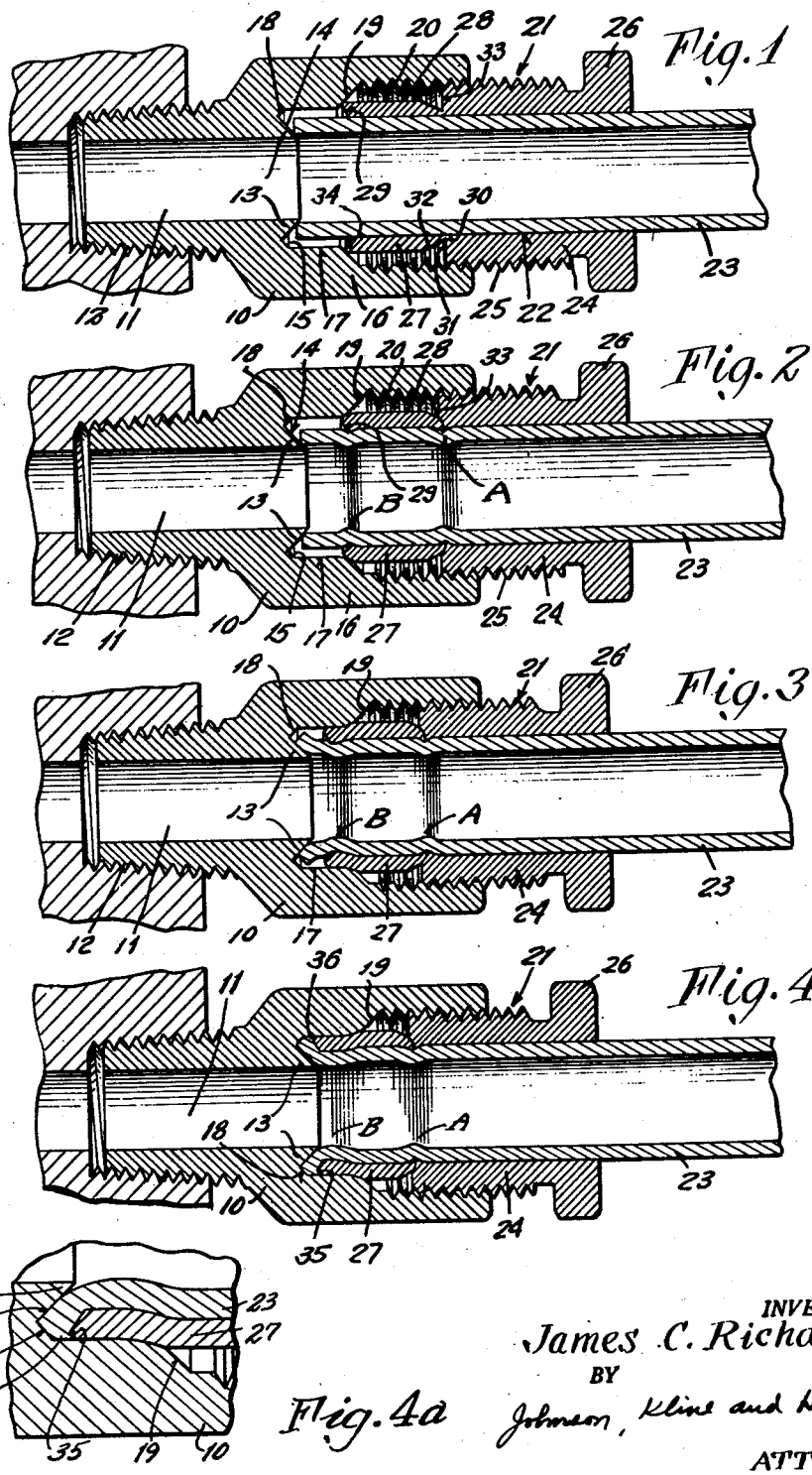

2,497,274

UNITED STATES PATENT OFFICE 2,497,274

PIPE CONNECTOR

James C. Richardson, Utica, N. Y., assignor to The Brockway Company, Naugatuck, Conn., a corporation of Connecticut Application October 2, 1946, Serial No. 700,691

7 Claims. (Cl. 285—166)

This invention relates to connectors for ductile pipe, tubing, and the like; and more particularly to connectors of the type which cause the pipe to flare as the connection is being made up.

Several other species of connectors of this type are disclosed in my co-pending applications Serial Numbers 691,914, filed August 21, 1946 and Serial Number 697,692 filed September 18, 1946, wherein the problems involved and the solutions offered are fully described.

In the connectors disclosed in my aforesaid co-pending applications, three parts are employed comprising a body having a flare-forming projection and a recess for receiving the flared portion of the pipe, means such as a draft member for engaging the body to make up the connection, and a ferrule for gripping and advancing the pipe. Cooperation of the draft member with the body advances the pipe upon the flare-forming projection as the draft member is tightened, finally clamping the flared portion of the pipe against the flare-forming surface of said projection and filling the recess behind the flare so as to seal the joint between the ferrule and pipe on the one hand, and between the body and ferrule on the other hand.

In accordance with the invention herein described, the draft member and ferrule of the foregoing constructions are replaced by a single connector having a cylindrical bore for receiving the pipe without obstruction to its insertion, said connector being frangible in two parts during the making up of said connection, one of the two parts including draft means and performing the functions of the draft member, and the other part, herein called "the sleeve," performing the function of the ferrule of the previous constructions.

The two parts formed by fracture of the connector as aforesaid, cooperate with the body to grip and emboss the pipe circumferentially at the commencement of the flaring operation not only at the base of the flare-forming end of the pipe, but also at a longitudinally spaced point along the pipe, thus providing two longitudinally spaced positive driving connections between the pipe and the connector for advancing the end of the pipe over the flare-forming projection, such operation being similar in this respect to that of the construction described in my aforesaid co-pending application Serial Number 697,692. The resulting engagement likewise presents maximum resistance to loosening of the joint by lateral or longitudinal forces or vibrations applied to the pipe after the connection is made up.

The parts of my connector are designed so that the contour thereof is the same for connections of a range of pipe sizes, so that the profile of the tools and gauges for making and inspecting the parts are the same for a variety of pipe sizes, the variations between such parts being solely in their diameters. Hence, the same gauges and tools can be used in making the connector herein described in a range of sizes.

Another feature of my invention, which it shares with the construction shown in my last-mentioned application, involves the provision of means whereby the connector can be started on the body prior to insertion of the pipe, so that all of the parts can be supplied ready to receive the pipe to make up the connection.

Still another feature of my invention involves means for shaping the leading end of the connector so that it will swage the forward end of the flared portion of the pipe to form a reverse flange into which the sleeve of the connector is forced, thus forming an interlock holding the end of the pipe firmly seated against the base of the recess in the body into which it is flared.

Other features and advantages will appear from the following description, taken in conjunction with the accompanying drawings, wherein Fig. 1 is an axial cross-section of the parts of a connection according to the present invention, showing the position of the parts when the connector is started on the body or fitting, and a section of ductile pipe inserted therein ready to be flared.

Fig. 2 is a similar view, showing the position of the parts during the flare-forming operation.

Fig. 3 is a view similar to Fig. 2, showing completion of the flare-forming operation.

Fig. 4 is a view similar to Figs. 2 and 3, showing the parts in the positions which they assume when the connection is completed.

Fig. 4a is an enlargement of part of Fig. 4, showing the flared end of the pipe and the adjacent parts.

Figs. 5 and 6, and 7 and 8 are respectively like Figs. 1 and 4 but show modified forms of the device shown in Figs. 1 to 4.

Fig. 7a is an enlargement of part of Fig. 7, showing the interior and exterior grooves separated by a wall which constitutes the frangible connection between the sleeve and the draft member.

The term "pipe" as used herein is intended to include all types of hollow bodies, such as are commonly called pipes, tubes, conduits, etc., and the term "fitting" as used herein refers to all types of separate or separable or integral parts of such size and form as are adapted to constitute the body of the connector, and to receive the draft means of the connector.

The form of connector disclosed herein comprises a body 10, having a central bore 11, and which may have a screw-threaded portion 12, adapted to be threaded into a hole in a structure or device to which it is desired to connect a pipe through the central bore 11. If convenient or desirable, the body 10 can be made integral with such other structure or device.

For the purposes of this invention, the body 10 is provided with a flare-forming projection 13 through which the bore 11 extends, having a conical flare-forming outer surface 14. The projection 13 is located in a recess or cavity 15, surrounded by a projecting sleeve 16 having an internal cylindrical wall 17 facing the conical surface 14 of the projection 13. The conical flare-forming surface 14 is joined to the cylindrical surface 17 by a narrow conical, or concave fillet-like annular surface 18, extending approximately at right angles to the conical surface 14, to form an abutment or seat for receiving the rim of the flare on the end of a pipe. The interior wall of the sleeve 16 diverges at the end of the cylindrical wall 17 of the cavity 15, for example, along a conical surface 19 to serve as a cam means for cooperation with the connector sleeve hereinafter described. The sleeve 16 of the body also includes draft means, for example, an internally threaded portion 20 beyond the conical cam surface 19 for cooperation with corresponding draft means on the connector. The body herein described can be made in one piece or of several pieces, assembled to provide the foregoing structural elements.

The connector 21 in the form of the invention illustrated in Figs. 1 to 4, inclusive, is a tubular member having a cylindrical bore 22 extending therethrough for slidably receiving a piece of ductile pipe 23, and offering no obstruction to insertion of the pipe in said bore. Said connector comprises an outer draft portion 24, having draft means such as external threads 25 for engaging the corresponding draft means such as the internal threads 20 on the body 10, and a nut portion 26, which may be of conventional hexagonal or square shape, adapted to be engaged by a wrench or similar tool for tightening the connector on the body in making up the connection.

Moreover, the connector 21 comprises an inner sleeve 27 having an outer cylindrical surface 28 of slightly larger diameter than the cylindrical surface 17 of the body. At its forward or leading end, the sleeve 27 has a receding conical clamping surface 29 for clamping the flared end of a piece of ductile pipe against the conical surface 14 of the flare-forming projection 13. The apex angle of the cone forming the clamping surface 29 is substantially wider than that of the cone forming the flaring surface 14, for reasons which will hereinafter appear.

The sleeve 27 is connected to the draft portion 24 of the connector member 21 at a frangible web or connection 30, preferably formed by cutting an external annular groove 31 at the junction of the two parts, the groove being for example, of V-shaped cross-section. The wall 32 on the sleeve side of groove 31 diverges forwardly from the axis of the connector, and is conical in the construction shown in Figs. 1 to 4, while the opposite wall 33 of the groove is flat, lying in a plane at right angles to the axis of the connector.

The leading edge of the sleeve 27 is preferably flattened to form a narrow annular surface 34 at the leading edge, approximately at right angles to the axis of the connector.

In common with the forms of the invention shown in my aforesaid co-pending applications, the connector herein described may be attached to the body or fitting by having the threaded portion or other draft means of one part started on the corresponding draft means of the other part. The pipe is then inserted into the bore 22 of the connector 21 until the end of the pipe engages the flare-forming projection 13 as shown in Fig. 1. The connector is then screwed into the body 10. During this operation, the sleeve 27 encounters an obstruction on the body offering resistance to further advancement of the sleeve, and accompanied by frictional resistance to further rotation of the sleeve relative to the body. The resulting compression and shearing torque applied to the frangible connection 30 between the sleeve and draft portions of the connector fractures the connection so that the sleeve is thereafter advanced by the draft portion of the connector without rotation of the sleeve and pipe. Cooperation of cam means on the body with the sleeve upon advancement thereof by the draft portion of the connector constricts the leading end of the sleeve inward against the pipe 23 and embosses the pipe, forming a driving connection between the pipe and the leading end of the sleeve.

Moreover, in the preferred form of the invention, in which the frangible connection between the sleeve and draft portions of the connector is formed by an external groove, preferably having a forwardly divergent wall on the sleeve side thereof, axial compression of the sleeve by the draft means against the resistance offered by the body causes inward flexure of the sleeve at the frangible connection to compress the rear end of the sleeve against the pipe, and embossing the latter to form a second driving connection between the sleeve and the pipe, axially spaced from the driving connection at the leading end of the sleeve. By virtue of the camming action of the forwardly diverging surface on the rear end of the sleeve, the compression applied by the draft member to the fractured end of the sleeve continues to force the rear end of the sleeve inward against the pipe during further tightening of the draft means.

Further advancement of the sleeve by tightening of the draft portion of the connector on the body advances the end of the pipe against the flare-forming projection on the body, causing the pipe to ride up over its conical surface and become flared, until the pipe reaches the bottom of the cavity surrounding the projection. At the same time the draft member forces the sleeve into the space between the pipe and the wall 17 of the body, behind the flared end of the pipe. The leading edge of sleeve 27 is deformed by the camming action of the body as it enters said space, forming a receding chamfer. Finally, as the end of the sleeve 27 reaches the end of its travel it swages the flared material of the pipe to fill the space between the end of the sleeve and the flare-forming projection and molds the edge of the pipe into the chamfer on the end of the sleeve, thus forming a reverse flange at the edge of the pipe which interlocks with the chamfer, forming a leak-tight seal between the pipe and the body, between the pipe and the sleeve, and between the body and sleeve, and positively clamping the pipe against axial or lateral movement.

After the connection is made up, the draft portion of the connector can be backed out of the body, and the pipe together with sleeve can be removed from the body to permit inspection or cleaning of the connection. If it is not convenient to flare the end of the pipe directly on the body or fitting 10, the pipe may be pre-flared by using a similarly shaped piece as a tool, and then after the pipe is flared, it can be applied to the body 10, together with the sleeve by simply tightening the draft portion of the connector into the body.

It will be seen from what has been said and from what follows, in the use of the connection of the present invention it is not necessary to preform the pipe or place on the pipe any sleeve, connector member, or nut. It is merely necessary to cut the pipe to the desired length, insert the same into the connector while the latter is started on the body, and tighten the connector thereon.

One of the features of the invention illustrated in this application is the arrangement whereby the connector is caused to emboss the pipe not only at the base of the flare adjacent the end of the pipe, but also circumferentially at a point longitudinally spaced from the forward embossing. This is accomplished by forming an external circumferential groove extending inward toward the wall of the bore far enough to leave only a relative easily bendable and fragile bridge or web of metal joining the two parts of the connector so as to provide a frangible connection between the sleeve and draft portion of the connector; and by constructing the leading end of the connector to engage an obstruction on the body adjacent the periphery of the sleeve at a greater radial distance from the axis of the connector than the frangible web at the base of the groove. While it is not desired to limit the invention to any theory of operation, it appears probable that the effect of such construction is as follows. When the connector is advanced on the body by the draft means until the leading end of the connector encounters said obstruction on the body, further tightening of the draft means applies compression at the obstruction which is transmitted to the frangible web at the base of the groove in a direction converging toward the axis of the connector. The compressive force thus has a component at the web tending to collapse the web or frangible connection inwardly toward the axis of the connector, and against the wall of a pipe inserted therein. The bridge or web thus yields inwardly under said compressive force, gripping and embossing the wall of a piece of pipe inserted into the bore of the connector, to form a driving connection therewith. The web or frangible connection can fail by reason of the inward flexure thereof as aforesaid, and/or by reason of the shearing effect of the torque applied thereto against the frictional resistance to rotation of the forward end of the sleeve at the point where it engages the body. Thereafter the severed sleeve advances without rotation relative to the pipe or the body, and independently of rotation of the draft portion of the connector.

By constructing the wall of the groove on the sleeve side thereof to diverge forwardly, the divergent surface tending to cause further inward flexure of the fractured end of the sleeve against the pipe by reason of the camming action of said convergent surface in contact with the driving surface of the draft portion of the connector. Thus, in the illustrated form of the invention the groove is V-shaped having the wall thereof on the sleeve of the connector slanting rearwardly and inwardly toward the apex of the V, while the other wall is substantially at right angles to the axis of the connector.

The operation of my connector during the making up of the fitting will be explained with reference to Figs. 1 to 4 of the drawings. Connector 21 is threaded into the fitting 10, until the leading end of the sleeve 27 of the connector encounters the inwardly convergent conical cam surface 19 on the body as shown in Fig. 1, obstructing further inward movement of the connector along an annular line of contact having a radius corresponding substantially to the radius of the cylindrical surface 28 on the sleeve 27.

The pipe 23 is inserted in the bore 22 of the connector until it contacts the projection 13 on the body. Upon tightening the draft portion 24, compression is applied between the end of the sleeve 27 and the obstructing cam surface 19 on the body, which is transmitted to the frangible bridge or web 30 interconnecting the sleeve 27 and draft member 24 in a direction converging rearwardly toward the axis of the connector causing the bridge to yield inwardly as shown in Fig. 2. The inward flexure of the rear end of the sleeve 27 embosses the pipe 23 at A, and thus forms a driving connection therewith at a point substantially spaced behind the flare-forming end of the pipe.

Further tightening of the outer portion 24 of connector 21 fractures the bridge 30 by reason of the frictional resistance to rotation of the sleeve 27, and/or by reason of the aforesaid inward flexure of the frangible bridge. Such further tightening also tends to compress the fractured edge of the sleeve 27 still further inward by co-action of the flat surface 33 of the draft member 24 and the forwardly diverging surface 32 on the sleeve 27, thus increasing the gripping action of the rear end of the sleeve against the pipe. Ordinarily the leading end of the draft portion 24 is also deformed by compression at the frangible web 30, and forced inward into the embossment A of the pipe 23.

At the same time compression applied by the draft portion 24 to sleeve 27 forces the leading end of the sleeve against the cam surface 19 on the body so that the latter cams the end of the sleeve inward to compress the sleeve against the pipe 23 further embossing the pipe, as indicated at B, and thus forming a second driving connection at the base of the end of the pipe which is to be flared. The sleeve 27 is thereby constricted so that it enters the cylindrical recess formed by the wall 17 of the body 10.

Compression of the leading end of the sleeve 27 against conical cam surface 19 deforms the end of the sleeve, so that the apex angle of the conical clamping surface 29 on the sleeve is reduced. However the reduced angle still remains slightly greater than that of the conical surface 14 on the flare-forming projection 13. Moreover, as the leading end of the sleeve 27 rides inward along conical surface 19 on the body, the flat annular edge surface 34 is deformed to form a chamfer 35 slanting rearwardly on the sleeve. The pipe 23, being gripped by sleeve 27 at the two embossments A and B, is carried forward by the sleeve, as the draft portion 24 of the connector continues to be tightened, against and over the end of the flare-forming projection 13 on the body, until the edge of the flare abuts the surface 18 at the base of the recess or cavity 15 in the body as shown in Fig. 3. The sleeve 27 then moves forward along the pipe toward the base of the recess behind the flared end of the pipe, until conical surface 29 on the forward end of the sleeve 27 engages the flared end of the pipe to clamp it against the conical surface 14 of projection 13. Further tightening of the member 24 causes the leading end of sleeve 27 to swage the flared portion of the pipe 23, causing the metal thereof to flow outward so as to fill the space in front of the sleeve by reason of the divergency of the conical surfaces 14 and 29 between which the flare is clamped. Such flow of the metal causes the latter to fill the space in front of the receding chamfer 35 on the end of the sleeve, thus forming a reverse flange 36 interlocking with the chamfer at the outer edge of the sleeve 27. The slight advancement of the sleeve 27 over the pipe during the final tightening operation merely advances the driving connections at A and B between the sleeve and the pipe, ironing out the wall of the pipe. Final tightening of the draft portion 24 moreover tends to cam the rear end of sleeve 27 further inward so as to clamp the pipe even more firmly at the embossed portion A, and form a secure seal rearwardly of the flared clamped end thereof.

The aforesaid swaging effect of the final tightening operation forms a seal not only between projection 13 and the flared end of pipe 23, but also between the sleeve 27 and the outer surface of the pipe, and likewise, between the reverse flange 36 on the end of the pipe and the outer wall 17 of the body.

It will be seen that when the connection is made up the pipe has an undulating surface in contact with corresponding undulations in the surface of the connector, whereby the connector grips the pipe circumferentially at axially spaced points, offering maximum resistance to axial or lateral movement of the pipe on the body, and thus offering maximum resistance to loosening of the joint by lateral as well as axial vibration or force applied to the pipe. Moreover, the clamped interlocked engagement of the sleeve with the flared end of the pipe further reinforces the joint against loosening or failure. This effect is obtained without any tendency of the gripping or clamping parts to cut into the pipe in such a manner as to weaken its resistance to fracture at any point.

In common with the construction shown in my aforesaid copending applications, the flaring of the pipe occurs by extrusion over the flare-forming projection, rather than by spinning the end of the pipe thereon, which occurs in most prior constructions in which the pipe turns during the flaring operation. Because of this feature of the invention, should the pipe be of the type known as Bundy tubing which has slight longitudinal grooves extending along the same on both its interior and exterior surfaces, leaks cannot occur through the grooves, since the metal of the flare-forming projection as well as of the connector is virtually kneaded into the pipe when the latter is flared by the aforesaid straight line extrusion.

When it is desired to dismantle the pipe for cleaning, the draft portion 24 of the connector is merely unscrewed from the fitting 10. The blunted inwardly extending portion formed at the leading end of the draft member 24 upon fracture of the web 30 and compression applied at the fracture engages the rear end of the embossed portion A on pipe 23, tending to withdraw the flared end of the pipe together with sleeve 27 from the cavity 15 of the body. If desired, the flared end of the pipe 23 and the sleeve 27 can be reinserted in the body, and then the draft portion 24 of the connector again tightened thereon to reclamp the flared end of the pipe to the body. Final tightening of the draft portion 24 again compresses the rear end of the sleeve 27 and by virtue of the camming action of conical surface 32 on the sleeve, the latter is again constricted against the pipe to thus reestablish a firm clamping effect between the rear end of the sleeve and the pipe.

The length of the cylindrical wall 17 of the cavity 15 on the body is related to the length of the flare-forming projection 13 so that the pipe 23, when inserted into the connector 21 until its end abuts projection 13, will be gripped to form the embossment B a sufficient distance behind its leading edge to insure upon flaring that its flared rim will abut the end surface 18 at the base of the recess 15.

Since the longitudinal dimensions of the connector parts are independent of the diameters thereof, the same screw machine tools and dies can be used for making the connector in accordance with my invention for pipe of various diameters. By reason of the improved swaging action of the end of the sleeve 27 to form a reverse flange 36 on the end of the pipe, interlocking with a chamfer on the sleeve 27, the length of the projection 13 can be substantially reduced without sacrificing or substantially reducing resistance of the joint to leakage or loosening by external force applied thereto. By making the projection 16 relatively short, it is more convenient for making up short lengths of pipe for connecting a pair of fixed fittings, less lateral bowing of the pipe being required to make a desired straight short connection.

In the embodiment of the invention hereinbefore described, and illustrated in Figs. 1 to 4, the groove 31 is of V-shaped cross-section having a flat surface on the leading end of the draft portion 24 of the connector 21, and a forwardly diverging conical surface 32 on the trailing end of the sleeve 27. However, modified forms of grooves can be employed to advantage to attain improved operation in the case of special types of pipe to be flared and connected. Thus, as shown in Figs. 5 and 6, the connector is constructed in the same manner as in Figs. 1 to 4, except that a different type of grooves is substituted for the groove 31. Those parts of the connection of Figs. 5 and 6 which are similar to those illustrated in Figs. 1 and 4 are identified by the same reference numerals but with the postscript a. Thus, the connection comprises a body 10a similar to the body 10 of Figs. 1 to 4, and a connector 21a in which the rear or draft portion 24a has external threads 25a and a nut portion 26a similar to the corresponding parts of the connector 21. Moreover, the connector 21a has a sleeve 27a of which the leading end comprises an inwardly receding conical clamping surface 29a, and a cylindrical outer surface 28a slightly larger in diameter than the cylindrical wall 17a of the recess 15a on the body. At the junction of the sleeve 27a with the draft portion 24a of the connector, an annular groove 37a is formed, having a receding conical wall 38 on the rearward or draft portion side of the groove, and a pair of conical surfaces 39 and 40 forming the wall of the groove on the forward or sleeve side thereof. The outer conical surface 40 has a considerably larger apex angle than that of the inner conical surface 39, but the apex angle of the outer surface 40 is slightly less than the apex angle of the conical surface 38 on the draft portion so that the opposite walls of the groove are divergent. The frangible connection 41 between the sleeve 27a and the draft portion 24a occurs at the junction of the conical surfaces 38 and 39.

When the connector 21a is tightened so as to cause fracture of the frangible web or bridge 41, the inwardly receding conical surface 38 on the forward end of the draft portion 24a rides forwardly over the relatively gradual incline of the conical surface 39, forcing the metal thereof inward with more positive camming action than in the case of the construction shown in Figs. 1 to 4, thus providing a firmer driving connection at this point with the pipe 23a within the bore 22a of the connector. Finally the conical surface 38 on the leading end of the draft portion 24a clamps against the conical surface 40 camming the trailing end of the sleeve 27a inward against the wall of the pipe 23a. This arrangement facilitates fracture and inward deformation of the metal at the base of the annular groove 37a, while at the same time avoiding excessive axial compression of the sleeve 27a, which, in the case of some materials, might tend to bow the sleeve outward excessively during the making up of the connection. The provision of a groove of the type shown in Figs. 5 and 6 thus adapts the connection for operation with pipe of relatively stiff material, offering greater resistance to the embossing and flaring operations to be performed thereon.

When the material employed in making the connector 21a is relatively resistant to deformation, the leading edge surface of the sleeve 27a can be preformed as a receding chamfer 42 instead of depending upon deformation of the surface by action of conical cam surface 19a on the body during the making up of the joint, as is the case in the construction of Figs. 1 to 4.

Another form of annular groove forming a frangible connection between the sleeve portion and draft portion of the connector is shown in Figs. 7 and 8, such modified construction being still more effective in facilitating the operation of the connector with pipe or tubing of material which is highly resistant to the embossing and flaring operations to be performed thereon. In the joint shown in Figs. 7 and 8, the portions and elements which are similar to those shown in Figs. 1 to 4 are identified by the same reference numerals, but with the postscript b. Thus, the connector 21b in this case comprises a nut portion 26b and external threads 25b on the rear or draft portion 24b, and a sleeve 27b the forward end of which may be similar to the sleeve 27. An external annular groove 43 is cut in the connector 21b at the junction of the sleeve 27b and the draft portion 24b having a rear wall 44 which may be flat like wall 33 in Figs. 1 to 4, or conical like wall 38 in Fig. 5. The opposite wall on the sleeve side of the groove 43 is formed by a pair of conical surfaces 45 and 46 the inner surface 45 having a relatively acute apex angle, while the outer surface 46 has a relatively obtuse apex angle.

An internal annular groove 47 is provided in the wall of the bore 22b, a short distance behind the innermost apex of groove 43, having a conical wall 48 which is substantially a continuation of the inner conical surface 45 of groove 43. The opposite wall 49 of groove 47 can be flat or substantially parallel to the wall 44 of groove 43. The frangible bridge between the draft portion 24b and the sleeve 27b of connector 21b is constituted by the metal web 50 between the innermost apices of grooves 43 and 47, fracture of said web occurring in response to compressive force applied thereto upon tightening the draft portion 24b on the body 10b against the resistance to forward movement of sleeve 27b when it encounters cam surface 19b on the body. Such compressive force tends to shear the web 50 along the conical surfaces 45 and 48 of grooves 43 and 47. After such fracture occurs the wedge surface constituted by the fracture and the conical surface 48 of groove 47 rides up over the conical surface 45 on the trailing end of the sleeve 27b wedging the latter inward against the tube 23b until the surface 44 on the draft portion 24b encounters the relatively steep conical surface 46 of groove 43. Further compression deforms the contacting surfaces of the draft portion 24b and of sleeve 27b causing them to flow together along a surface of rounded contour as shown in Fig. 8, firmly clamping the rear end of the sleeve 27b against the pipe 23b, and forming an effective seal between the draft portion 24b and the sleeve 27b along the deformed contacting surfaces thereof. A chamfer 51 at the leading end of sleeve 27b replaces the flat surface 34 of Figs. 1 to 4, as in Figs. 5 and 6, facilitating entry of the sleeve 27b into cavity 15b of the body.

The threads providing the draft means interconnecting the body and the connector can be modified or reversed or other draft means substituted therefor. However, economy in manufacture of the connector is obtained by making the threads on the connector external so as to engage internal threads on the body or fitting.

In the illustrated embodiment of this invention, the pipe gripping sleeve and the male threaded nut are initially formed of one piece with the frangible wall between them. This is done for convenience in manufacture assembly and in making up the connection. If desired, however, these pieces may be made separate and may be so used. Or, they may be made initially separate and may be soldered, brazed or otherwise semi-permanently united for assembly and use.

Variations and modifications may be made within the scope of this invention and portions of the improvements may be used without others.

I claim:

1. A pipe connector comprising a body member having a projection having a flare-forming surface, an axially extending wall surrounding said projection and with the latter providing a flare-receiving recess of determinate size to contain the flared pipe and the hereinafter mentioned sleeve, said recess extending axially beyond said flare-forming surface of the projection a determinate distance dependent upon the amount of the pipe to be flared, a draft member threaded to said body member, a sleeve joined to the draft member by a frangible connection and having a bore of greater diameter than the smallest diameter of said projection to freely pass a pipe therethrough to abut said flare-forming surface of said projection, said sleeve having an abutment portion the outer diameter of which exceeds the diameter of said recess so that the abutment portion of the sleeve engages the wall at the outer end of the recess, whereby further threading of the draft member upon said body shears said frangible connection so that the draft member may rotate without rotating said sleeve, and upon continued threading of the draft member advances said sleeve into the recess by abutting engagement of the draft member with the sleeve to be compressed into clamping engagement with the pipe at a place thereon spaced a distance from the pipe end dependent upon said determinate distance to extrude said pipe along the flare-forming surface of the projection and substantially fill said recess to form a leak-tight joint with said pipe.

2. The invention as defined in claim 1, in which the leading end of the sleeve has an outwardly and rearwardly extending chamfer to swage a reverse flange on the rim of the flared portion of the pipe when it is forced into clamping engagement with the pipe against said projection.

3. The invention as defined in claim 2, in which the leading end of the sleeve and the flare-forming projection of the body have conical clamping surfaces divergent in the direction of advancement of the pipe to swage the end of the pipe outwardly to fill the recess in front of the sleeve as the sleeve advances into clamping engagement with the flared-end of the pipe.

4. The invention as defined in claim 1, in which the frangible connection comprises a fracturable web left by an annular groove in the sleeve at the junction of the sleeve and draft member, said annular groove having a radial wall inclined toward the axis of the sleeve and pipe and cooperating with a surface opposite it after the web has been fractured, to deflect the fractured end of the sleeve inwardly and deform and grip the pipe for forward advancing movement with the sleeve.

5. The invention as defined in claim 4, in which the annular groove is in the exterior surface of the sleeve and the inclined wall of the groove faces the draft member and inclines inwardly and rearwardly.

6. The invention as defined in claim 5, in which the sleeve also has an annular groove on its interior surface spaced longitudinally from the external groove by the width of said web, the forwardly facing wall of said interior groove being inclined inwardly and rearwardly and cooperating with said inclined wall of the external groove when said web is sheared to facilitate the deflection of the fractured end of the sleeve.

7. A pipe coupling comprising a body member having a flare-forming conical surface adapted to engage and position the end of a pipe inserted in said body member for connection therewith, a cylindrical surface in said member forming a recess surrounding said conical surface and being of a size to contain the flared pipe and the hereinafter mentioned sleeve and extending beyond the end of the conical surface a determinate distance dependent upon the amount of the pipe to be flared, an inwardly and forwardly inclined camming edge formed at the outer end of the cylindrical surface, a connector comprising a draft member adapted to be threaded to said body member and a sleeve connected to and supported on said draft member by a frangible connection, said sleeve having a bore adapted to permit a pipe to be freely passed therethrough and into abutment with said conical surface, the outer diameter of the sleeve exceeding the diameter of the recess, so that when the draft member is connected to the body member with the end of the sleeve abutting said camming surface and advancement of the sleeve is resisted thereby and a pipe is inserted through the sleeve into abutment with said conical surface, the pipe will be automatically positioned beyond the inner end of the sleeve a distance sufficient to automatically provide the requisite length of pipe beyond said sleeve to form the correct length of flare thereon, whereby when said draft member is further advanced along the body member said frangible connection is sheared so that the draft member may rotate without rotating said sleeve, said sleeve being in abutting relation with the draft member to be advanced thereby against said camming edge and be compressed to grip the pipe and extrude said measured length of pipe along said conical surface without rotation of the pipe.

JAMES C. RICHARDSON.

REFERENCES CITED

The following references are of record in the file of this patent:

UNITED STATES PATENTS

| Number | Name | Date |
| --- | --- | --- |
| 2,112,239 | Guarnaschelli | Mar. 29, 1938 |
| 2,182,811 | Kocher | Dec. 12, 1939 |
| 2,289,382 | Parker | July 14, 1942 |